United States Patent [19]

Schertz

[11] 4,382,568
[45] May 10, 1983

[54] AIRPLANE SPREADER APPARATUS

[76] Inventor: Robert O. Schertz, R.R. #1, El Paso, Ill. 61738

[21] Appl. No.: 133,581

[22] Filed: Mar. 24, 1980

[51] Int. Cl.³ .............................................. B64D 1/16
[52] U.S. Cl. ..................................... 244/136; 222/43; 222/556; 239/171; 239/676; 239/660; 74/526
[58] Field of Search ............... 239/171, 650, 660, 676, 239/375, 11; 244/136; 222/43, 505, 510, 624, 222/625, 556, 560, 561; 74/526; 62/2 R

[56] References Cited

U.S. PATENT DOCUMENTS

| | | | |
|---|---|---|---|
| 2,189,217 | 2/1940 | McDonald | 74/526 |
| 2,776,581 | 1/1957 | Hamlin | 74/526 |
| 2,840,275 | 6/1958 | Liljenberg | 222/43 |
| 2,853,164 | 9/1958 | Sturdy | 74/526 UX |
| 2,924,040 | 2/1960 | White et al. | 239/171 |
| 3,393,875 | 7/1968 | Bryant, Jr. | 239/660 |
| 3,476,337 | 11/1969 | Corvett, Jr. | 239/171 |
| 3,700,043 | 10/1972 | Sullivan | 74/526 |
| 3,860,202 | 1/1975 | Johnson | 239/171 |
| 4,098,432 | 7/1978 | Oosterling et al. | 239/676 |
| 4,253,626 | 3/1981 | Muscatell | 244/136 |

Primary Examiner—Galen L. Barefoot

Attorney, Agent, or Firm—Fitch, Even, Tabin, Flannery & Welsh

[57] ABSTRACT

A spreader unit is provided for connection to a hopper carried in an airplane for spreading granular material at a controlled rate of flow. A moveable gate on the spreader is moveable between a closed position covering a discharging opening through which the granular material may flow and an open position defining a gap to allow a predetermined flow rate of granular material from the hopper. A new and improved adjustable control 70 is provided in the cockpit of the airplane adjacent the pilot for manipulation by the pilot to control the gate width to an accurate degree to provide the desired flow rate despite deflection or other binding or lost motion in the linkage or levers in the actuating means for the gate. The control is positioned on the spreader adjacent the gate and a spreader extends from the actuator into the cockpit. A turnable handle is positioned adjacent the pilot for adjusting the size of the gap and thereby the flow rate of the granular material from the hopper. The control means is preferably releasable with operation of an emergency handle, so that the gate may be swung to the open position along with an emergency gate to drop the contents of the hopper at time of danger to the pilot or the airplane.

8 Claims, 6 Drawing Figures

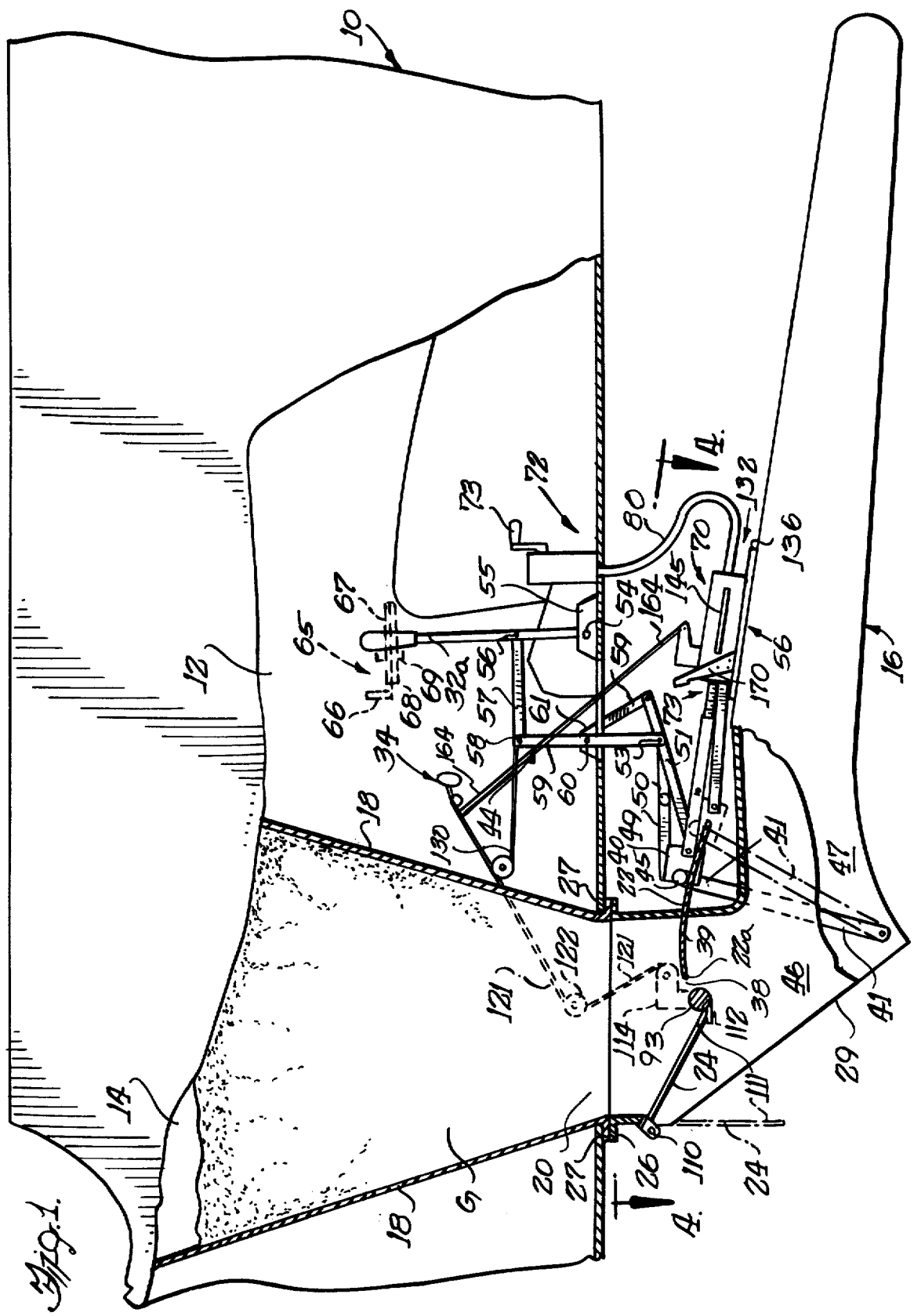

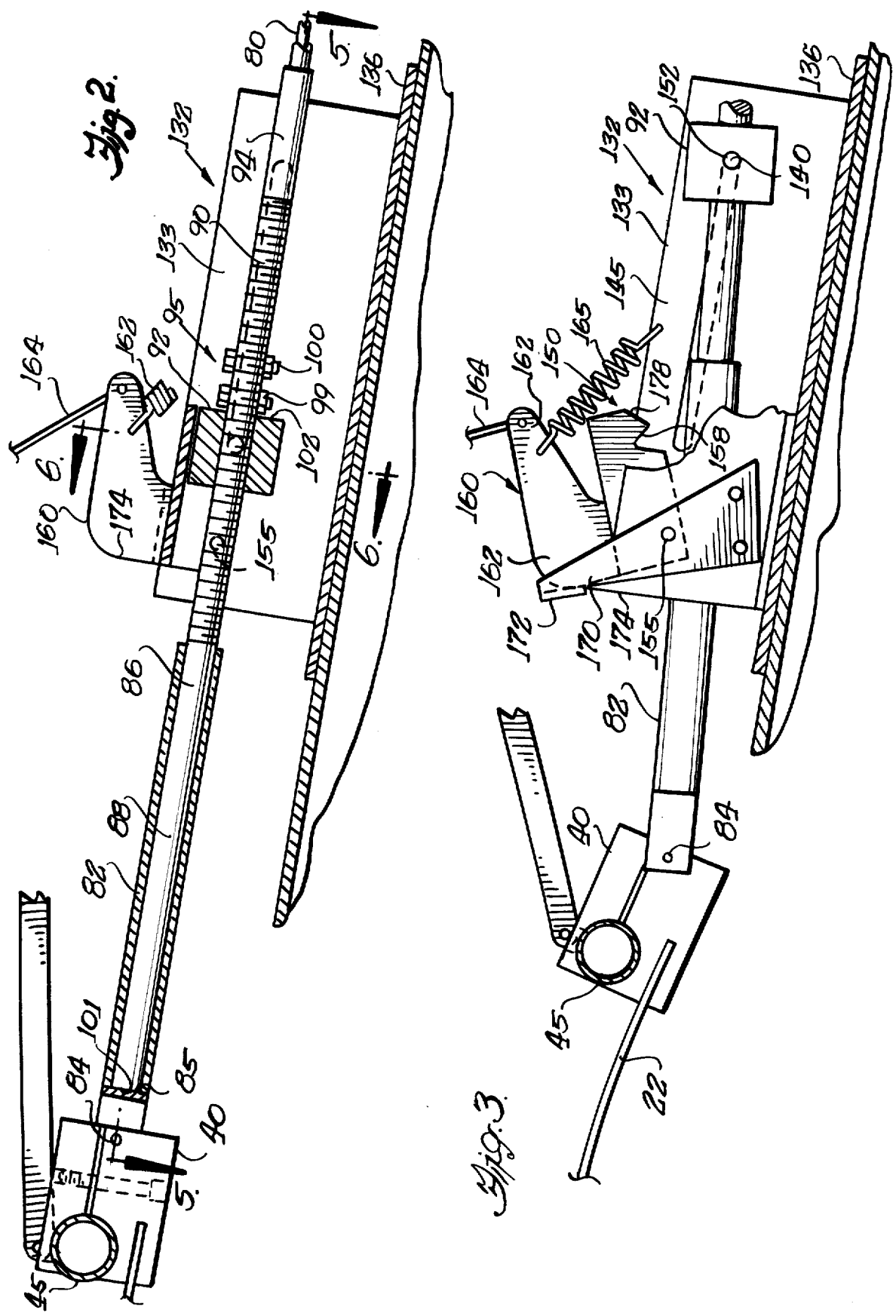

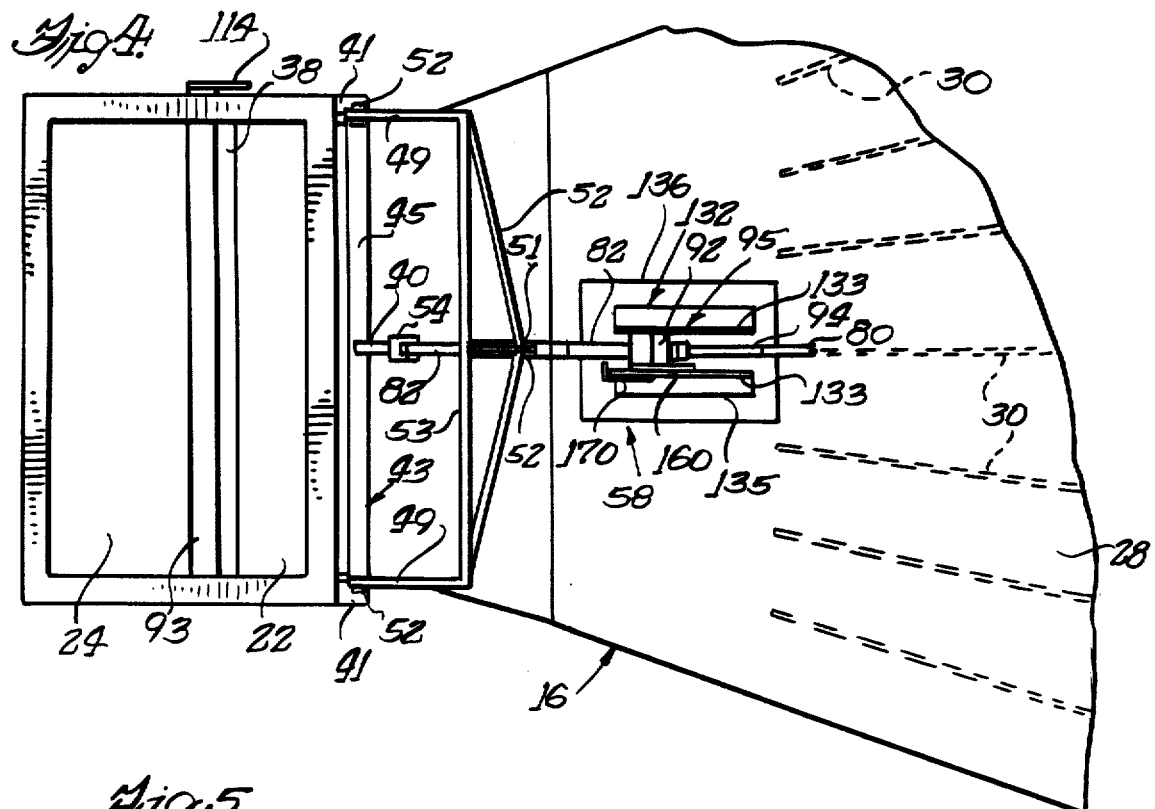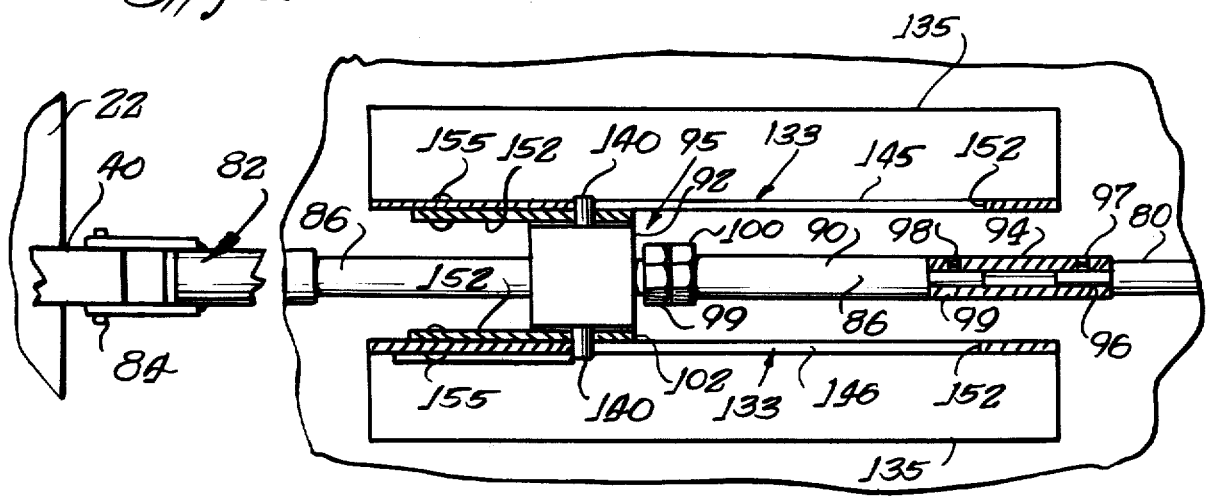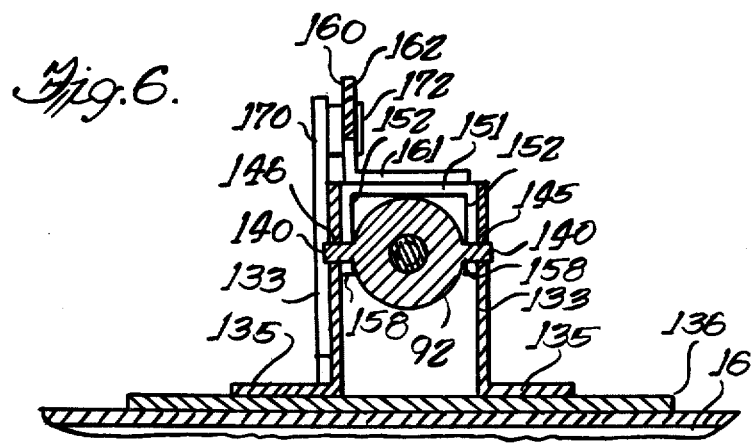

AIRPLANE SPREADER APPARATUS

BACKGROUND OF THE INVENTION

This invention relates to granular material spreader units for airplanes for the commonly known "crop duster" operations of spreading fertilizer, insecticides or other chemicals broadly over a field from a flying airplane.

The plane makes one or more passes or flights over the field at a low altitude and discharges the chemical during each pass at a controlled rate of application of granular material to the field. The pilot has a control mechanism for metering the chemical discharge from the plane and for starting and terminating the discharge at the beginning and at the end respectively of each pass. The granular material is carried in a hopper with a spreader unit located beneath the plane's fuselage and the granular material flows through a gap formed by a gate in the spreader unit and at the bottom of the hopper. An operating linkage extends from the gate to the cockpit so that the pilot by operating a lever for the linkage may quickly open or close the gate.

Because of the high cost of the chemical being dispensed and the need for dispensing the chemical uniformly over the field at a recommended rate of coverage, the flow rate control should be precisely controlled or metered. A particular problem in providing a sufficiently precise flow rate is at low rates such as for an insecticide sold under the trade name THIMET which need be applied only at a rate of approximately 5 pounds per acre.

More specifically, the hopper in the plane has a lower discharge opening and the discharge gate across the opening which is controlled by the pilot from within the plane cockpit. When the discharge gate is opened, granular chemical is dispensed from the hopper through a gap formed by the gate into the throat section of a tubular spreader located immediately below the hopper. The spreader has a fantail-shaped discharge at the rear, and the granular material is drawn by the passage of air through the spreader and is uniformly fantailed out to fall then along a strip of an appropriate width across the field. The size of the gap and hence, the flow rate is adjusted by the pilot and this includes an adjustable stop which is positioned to abut the activating lever for opening the discharge gate. That is, this adjustable stop limits the opening movement of the actuating lever to a specified point and the discharge gate is supposed to also form a gap precisely correlated with the stop for the granular material being applied.

Often the granular material is heavy and gritty, and provides in some instances, a resistance to opening movement of the gate, whereby the linkage tends to bend or deflect. This deflection makes for inaccuracies in the flow rate as the gap may be substantially smaller in size than it would be without the deflection. The gap for low flow rates may be only 3/16ths inch. A small deflection from this setting, such as ⅛ inch, changes the flow rate greatly. Also, the linkage is subject to wear and lost motion and other factors which make the gap adjustment most unreliable for some materials. Thus, there is a need for a new improved control of the gap in such machines.

SUMMARY OF THE INVENTION

The present invention is directed to a new and improved apparatus for control of a metering gate for granular materials being discharged from a hopper during a crop-dusting operation, and is particularly useful for controlling low flow rates. The spreader unit has a discharge gate which is moved between the closed and open positions by actuating linkage activated from the cockpit by the pilot. There is associated with the discharge gate, in direct proximity therewith an adjustable control means and operating means extending from the adjustable control means to be controlled by the pilot from within the cockpit. Preferably, the adjustable control means includes a stop means to limit opening of the gate to determine the properly adjusted gap. Also, an emergency gate and release mechanism is provided which is actuated by the pilot from the cockpit during an emergency situation to disable the stop means to allow the discharge gate to shift to a fully open position along with an emergency release gate. Preferably, the adjustable stop means is located on the spreader immediately proximate to the discharge gate so extreme accuracy in determining the effective gap is achieved, independently of play in or flex of the actuating linkage for shifting the gate to its open position.

BRIEF DESCRIPTION OF THE DRAWINGS

FIG. 1 is an elevational section-like view of an airplane fuselage having dusting apparatus mounted thereon, and showing also incorporated therein a preferred embodiment of the subject invention;

FIGS. 2 and 3 are enlarged views similar to FIG. 1, except showing important mechanism of the invention in two operating conditions;

FIG. 4 is a plan view of the mechanism as seen from line 4—4 in FIG. 1; and

FIGS. 5 and 6 are sectional views as seen respectively from lines 5—5 and 6—6 in FIG. 2.

DETAILED DESCRIPTION OF THE INVENTION

As shown in the drawings for purposes of illustration, there is disclosed an airplane 10 having a fuselage, a cockpit 12, a hopper 14, and a spreader 16 which is attached to outlet 20 of the hopper. The hopper 14 has sloped sidewalls 18 converging toward the lower outlet 20 that opens into the spreader 16, and discharge gate 22 and emergency gate 24 are disposed crosswise of the outlet just above the spreader. The discharge gate 22 and emergency gate 24, when closed, thus hold any granular material G in the hopper 14 from dropping into the spreader 16. The spreader 16 has an attachment flange 26 for bolting the spreader to a flange 27 on the bottom of the hopper. The spreader has a forward air inlet opening 29 through air flows and this air carries the granular material through a generally fantailed or divergent section of the spreader toward its outlet opening 28. To assist in dispersion, guide vanes 30 (FIG. 4) are mounted in the spreader.

The granular material G in the hopper rests on the top of the discharge gate 22 and emergency gate 24, which are controlled by the spreader pilot in cockpit 12. The illustrated discharge gate 24 is shifted between its closed position against a rod 93 and an open position in which its leading edge 22a is shifted from the rod 93 to define a gap or opening 38 between the rod 93 and the gate leading edge 22a. When the gate is in the open position, the granular material G dropping from the hopper is carried by the air stream passing through the spreader 16 to its outlet 28. The granular material G from the spreader outlet 28 freely falls as a strip across the field during a pass of the plane over the field.

In the preferred and illustrated embodiment of the invention, the gate 22 is slideable through a slot 39 in the upper rear wall of the spreader 16, which is a conventional gate for a "Grumman" kind of spreader which is a commercially available product. The gate is curved to coincide with a radius from the pivot pins 42. The discharge gate 22 thus travels in an arcuate path in this conventional spreader, the gate is supported and mounted for sliding movement by having its rear edge fixed to a horizontally extending pipe 45 of a U-shaped pipe 43 having depending legs 41 pivotally mounted at their lower ends by pivot pins 42 to opposite sidewalls 46 and 47 of the spreader. That is, the pipe 43 is a generally U-shaped bail pivoted at its lower ends at pivot pins 42 to swing its upper horizontal pipe 45 and attached rear edge of the gate in an arcuate path having an axis through the pivot pins 42. Also, in the conventional manner, and as best seen in FIG. 4, the pipe 45 is connected by another set of rearwardly extending pipes 49 and a crossbar pipe 50 to a centrally located connecting bracket 51 carried and secured to a central juncture of a pair of inclined pipes 52. The bracket 51 has a pivot pin connection 53 to the actuating means 44 which extends upwardly through a hole in the airplane fuselage to the cockpit all in a conventional manner.

The actuating means 44 includes an operating handle or lever 32a fulcrumed at its lower end to a pin 54 on block 55 and connected at pin 56 to a link 57. The link 57 is connected at pin 58 to an upper end of a second lever 59 which is pivotally mounted at a central location thereon by a pivot pin 60 carried by a bracket 61 on the airplane. The lower end of the second lever is connected by pin 53 to the central connecting bracket including the pipes 49 and 50. The lever 32a, link 57 and second lever 59 comprise a linkage connected to the gate 22 so that the pilot can operate the control lever 32a from within the cockpit 12 to open and close the discharge gate 22.

The conventional "Grumman" system employs a stop mechanism 65, shown in dotted lines in FIG. 1, which is located in the cockpit 12 to hit and stop the forward movement of the handle lever 32a. This stop mechanism includes a turnable handle 66 for turning a threaded shaft 67 in a nut 68 to move a stop 69 to a position to be abutted by the handle. While this stop mechanism 65 has long been used, there is a particular problem with the metering accuracy of such a system for light applications, i.e., 5 to 10 lbs per acre. The stop mechanism has numbers thereon which are supposed to be correlated with the size of the gap opening for the gap 38 so that the pilot may approximate the flow rate. Typically, the pilot will, while on the ground, turn the stop mechanism to a particular number, such as "13," and then catch the falling granular material for predetermined time and weight the same to see what the flow rate is while on the ground. However, because of vibrations and the settling of the material within the hopper when the airplane was flying, and because the gate 22 tends to bind on the gritty granular material and not to slide as easily as on the ground, the flow rate of the material while flying often does not correlate directly to the flow rate experienced on the ground, and hence, the numbers for the stop mechanism are fairly coarse and inaccurate. It will be appreciated that the spreader is at a considerable distance from the handle and stop mechanism 65.

It has been found that there is considerable deflection in the levers and/or linkage when the gate tends to bind and that the gap 38 does not relate very well to the numbers on the stop mechanism. When the application of granular material is too light, such as an insecticide, the farmer is considerably upset when the insects eat his crop because the rate of application was too low. On the other hand, chemicals, such as insecticides, are very expensive and there is a desire to keep the application rate uniform and at the desired rate so as not to waste additional granular material. Heretofore, the system described above was particularly unsuited for applying materials, such as an insecticide "Thimet" at the rate of about only five pounds per acre, which means, a gate gap of about ¼ inch for this Grumman type system. For other materials such as "Furadan" which is applied to kill corn borers, the opening is usually only about 3/16ths of an inch to apply 10 pounds per acre. Thus, it will be seen that the position of the free edge 22a relative to the rod 93 to define the width of the gap 38 should be very accurately controlled and should be sensitive and there is a need that the flow rate and gap opening be controlled precisely by the pilot while in the air.

In accordance with the present invention, there is provided a new and improved adjustable control means 70 which controls the extend of the opening gate 22, and hence, controls the width gap 38 to an accurate position despite the deflections or other binding or loss of motion in the linkage or levers in the actuating means 44, which opens the gate 22. This is achieved by having an adjustable control means 70 is positioned on the spreader 16 adjacent the gate and an operating means 72 for the adjustable control means 70 extends into the cockpit to a turnable handle 73 which adjusts the control means to control the size of the gap and the flow rate of the granular material. As will be described hereinafter in detail, the preferred control means includes an adjustable stop means 73 which serves to limit the travel of the gate 22 in the direction of opening with such accuracy that the pilot knows he will obtain exactly 1/16th of an inch increase in gap 38 with each one-turn of the crank handle 73. Naturally, ¼th of a turn of the crank handle 73 represents about 1/64th of an inch change in the gap 38. Also, explained hereinafter, the preferred adjustable controlled means is releasable with operation of the emergency handle 34, so that the gate 22 may also be swung to the open position along with the emergency gate 24 to drop the contents of the hopper at the time of danger to the pilot and the airplane.

Referring now in greater detail to the preferred embodiment of the invention, the operating means 72 includes a means extending from the cockpit adjacent the pilot's seat through the fuselage and to the spreader. Herein, this means comprises a flexible cable or shaft 80 which is turned to shift the stop means.

The adjustable control means 70 is connected to the block 40 secured to the crossbar 45 of the U-shaped pipe. Herein, this connection includes a hollow tube 82 which is pivoted at a clevis by a pin 84 (FIG. 2) to the block 40 so that the tube 82 thereby is secured to the discharge gate 22. The tube 82 is closed as at 85, adjacent the pivoted end, but is open at its other end to receive therein in telescoping relationship an end of a rod 86. The latter has a smooth end 88 and a threaded end 85. The smooth end 88 is fitted into the open bore of the tube 82 and with the threaded end 90 threaded through nut 92. The threaded end 90 of the rod is secured as by a connector 94 to a small diameter end 96 of the flexible shaft 80 which is directed to the cockpit of the plane 10. The connector 94 (FIG. 5) is a hollow tube receiving the small diameter end 96 against which the inner end of a set screw 97 abuts. A set screw 98 threaded into the connector abuts a small diameter end 99 of the rod 86. Thus, the connector connects the Bowdein wire 80 to the rod to turn its threaded portion 90 in the nut 92.

It will be understood that when the actuator means 32 is shifted to shift the discharge gate 22, the gate 22 slides the tube 82 along the rod 86. The smooth end 88 of the rod slides in the tube 82 and the end wall 85 on the tube abuts end 101 of the internal rod 86 to stop the movement of the gate at a precise location. The position of the rod end 101 is determined by the adjustment made turning the threaded portion 90 of the rod 86 in the nut 92. Manipulation of the wire 80 adjusts the rod axially through the nut 92 and relative to the frame to adjustable distances from the tube end 85 when the discharge gate 22 is closed. Thus, the end 101 of the rod remains stationary as the gate 22 is shifted to its closed position and carries the hollow tube 82 and its end wall 85 to a position spacing the latter from the stop end 101 of the rod.

To accurately zero the system so that one turn of the shaft 86 in the reverse direction assures an initial 1/16th inch gap between leading edge 22 of the gate 22 and the bar 93, the shaft 86 is stopped in its forward movement by a stop means when the gate edge 22a is initially abutting the bar 93 but is not substantially overlapping the bar 93. More specifically, the forward gate edge 22a can slide over the top of the bar 93 when the gate is closed and it would not be possible to have an exact location for the leading gate edge 22a without the stop means 95 which is in the form of lock nuts 99 and 100 threaded on the threaded shaft 90. The leading nut 99 may be turned on the shaft to abut rearward wall 102 of the nut 92, as shown in FIG. 2, when the shaft 90 is moved to its forward position to close the gate 22. Thus, the operator will open the gate and then close the same to just abut the forward edge 22a with the bar 93 and thread the nut 99 to abut the rearwall 102 of the nut to limit the forward turning and axial movement of the shaft through the nut. The second lock nut 100 is tightened against the lock nut 99 to hold the same against vibrating along the threaded shaft. When the threaded shaft is turned to move the stop end 101 of the rod from the end wall 85 to space the same, the lock nut 99 also moves away from the rearwalled wall 99 of the nut 92.

For each turn of the shaft 86 in the reverse direction, the stop 101 is shifted away from the tube end wall 85 by 1/16th inch in this instance as determined by the pitch of the threaded portion of the rod 86. The size of the gap between end wall 85 and stop end 101 will be the same dimension as the gap 38. Because end wall 85 and stop end 101 are within the tube 82 they are protected from dirt and foreign matter. Also, deflections in the actuating linkage will have no effect on the size of the gap 38. Preferably, the tube is lubricated for easy sliding of the rod therein.

Referring now to the emergency gate 24, the latter (FIG. 1) is pivoted at one end at pin 110, and its free end 111 is supported on a ledge 112 on the bar 93. The bar is rotatably mounted in bearings (not shown) supported by the spreader 16. A lever 114 is keyed to the protruding end of the rod 93 and is biased by a spring (not shown) into the position whereat the rod ledge 112 is beneath the free end of the emergency gate 24 and holds it closed. Appropriate means shown in the form of a cable 121 tracked over a pulley 122 is made between the emergency handle 34 in the cockpit and the lever 114 to allow for the movement of the lever from the cockpit. A rearward pull on the cable 121 rotates the rod 93 counterclockwise in FIG. 1 to move the support ledge 112 away and thereby allow the emergency gate to fall open (as shown in phantom in (FIG. 1) under the weight of the granular material G supported thereabove.

When the emergency handle 34 is pulled; the gate 22 must also open and assist in dumping the load. The present Grumman system has a cable 130 connected to the cable 121 to pull the top end of the lever 59 to shift the gate 22 open. However, unless the adjustable control means is released, the gate 22 will only travel a short distance before the end wall 85 abuts the stop end 101 of the rod 86.

For the purpose of releasing the stop means, the nut 92 is slideably mounted in a support frame 132 for travel rearwardly to an inactive or release position at the rearward end of the frame 132. Herein, the frame 132 comprises a pair of angle plates 133 (FIG. 6) which have flanges 135 bolted to a flat plate 136 mounted on to the top of the spreader 16. The nut 92 has a pair outwardly extending ears 140 of cylindrical shape inserted into horizontally extending slots 145 and 146 in vertical walls of the angle plates 133. At the time of an emergency the nut 92 is free to slide rearwardly from its normal position (FIG. 5) where it is held by a catch 150 to a position in which its ears 140 abut end walls 152 for the slots 145 and 146.

The preferred catch 150 includes a channel-shaped member, having a top web 151 (FIG. 6) and a pair of depending flanges 152 located inside the walls of the frame plates 133. Each of the flanges 152 has a notch 158 (FIG. 3) in its lower and rearward side to catch therein an ear 140 on the nut as shown in FIGS. 5 and 6. The flanges 152 are pivotally mounted by bolts 155 (FIG. 5) to the frame plates 133 forwardly of the ends of the slots 145 and 146.

To the top web 151 of the catch is secured a crank arm 160 which has a flat plate 161 secured to the web 151 and which has an integral upstanding angle-shaped portion 162 to which is connected one end of a release cable 164 (FIGS. 2 and 3). A contractile tensioned spring extending between portion 162 and the frame plate 133 holds the catch down in locking position with the nut ears 140 in the notches 158 until the cable 164 is pulled to pivot the catch upwardly as seen in FIG. 3. To limit the movement of the catch 150 to the release position by the cable 164, a fixed stop 170 is bolted to a frame plate 133 and a bent stop tab 172 thereon is positioned to be abutted by vertical side 174 of the crank arm 160. Inclined edges 178 on the catch webs 152 will be abutted when the nut ears 140 are returned and the latter will cam the flanges 152 up to allow the ears to move beneath the notches 158 which allows the spring 165 to snap the catch closed on the ears.

It will thus be appreciated that the pilot can accurately adjust the size of the discharge opening 38 provided when the discharge gate 22 is opened by shifting the adjustment end wall 101 relative to the gate. The pilot also can easily open the discharge gate 22 to its adjusted setting, as controlled by the adjustable control means, upon initial entry of each pass over the field, and can securely close the gate after the pass has been completed. Of course, the setting may be adjusted by the pilot while flying to vary the width of the gap 38. Also, any time during the dusting operation, should the occasion arise, the pilot can open the emergency gate 24 and simultaneously allow the discharge gate 22 to open completely upon manipulation of the emergency control 34, again from within the cockpit.

The invention has been described in connection with a preferred and illustrated embodiment of the invention but it is also capable of use with various other airplane spreader apparatus such as the conventional transland spreader in which the gate is pivoted along one edge and swings down to an open position. Here again, the positioning of the adjustable control means adjacent the gate and having an operating means for the control means extending to the cockpit will allow the pilot to more precisely meter the flow rate and gap through which the granular material flows.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed:

1. A spreader unit for connection to a hopper carried in an airplane for spreading granular material at a controlled rate of flow;
   said spreader unit being attached to the hopper and having a discharge opening, a movable gate on said spreader movable between a closed position covering said discharge opening and open position defining a gap through which granular material may flow;
   actuator means extending from said gate to the cockpit of the airplane for manipulation by the pilot to shift said gate between open and closed positions;
   adjustable control means located adjacent said gate for adjustable limiting the movement of said movable gate in the opening direction to control the size of gap and thereby the flow rate of granular material;
   operating means for extending from said adjustable control means to the cockpit for operation by the pilot to set the size of the gap and thereby the flow rate, said adjustable control means comprising relatively movable parts having stop surfaces for abutment to limit the opening movement of said gate, said parts having a lost motion connection therebetween allowing the stop surfaces to separate as said gate is moved to the closed position by said operating means, said relatively movable parts comprising a telescoping rod and tube each having one of said stop surfaces thereon for abutment to limit the travel of said gate in the opening direction, one of said telescoping parts being threaded, a nut for receiving in threaded engagement said threaded part, said operating means including means extending to said cockpit to turn said threaded part in said nut to shift the same and its stop surface relative to the other stop surface.

2. A spreader unit for connection to a hopper carried in an airplane for spreading granular material at a controlled rate of flow;
   said spreader unit being attached to the hopper and having a discharge opening, a movable gate on said spreader movable between a closed position covering said discharge opening and open position defining a gap through which granular material may flow;
   actuator means extending from said gate to the cockpit of the airplane for manipulation by the pilot to shift said gate between open and closed positions;
   adjustable control means located adjacent said gate for adjustable limiting the movement of said movable gate in the opening direction to control the size of gap and thereby the flow rate of granular material;
   operating means for extending from said adjustable control means to the cockpit for operation by the pilot to set the size of the gap and thereby the flow rate, an emergency release gate, means for shifting said emergency release gate to an open position to dump the load in the hopper, and means for disabling said adjustable control means to allow said movable gate to swing to a fully open position along with said emergency release gate.

3. A crop dusting airplane having a fuselage and including a hopper carried in an airplane for spreading granular material at a controlled rate of flow;
   a spreader unit located below the fuselage of the airplane and being attached to the hopper and having a discharge opening and means for dispersing the flow of granular material;
   a movable gate on said spreader movable between a closed position covering said discharge opening and open position defining a gap through which granular material may flow;
   actuator means extending from said gate through the airplane fuselage to the cockpit of the airplane for manipulation by the pilot to shift said gate between open and closed positions;
   adjustable control means carried on said spreader for adjustable limiting the movement of said slideable gate in the opening direction to control the size of gap and thereby the flow rate of granular material; and means extending from said adjustable control means and through said fuselage to the cockpit for manipulation of said control means by said pilot, said spreader unit including a housing located below the fuselage, said adjustable control means being secured to said housing and adjacent said gate and having stop means to limit the opening of said gate to a predetermined gap, emergency release means for disabling said adjustable control means at the time of an emergency.

4. For use in a crop dusting plane having a hopper with an outlet leading to a spreader, a discharge gate closing the outlet and control means to be operated by the pilot from the plane cockpit for moving the discharge gate for selectively opening and closing the outlet; the combination with said discharge gate of stop means disposed adjacent the discharge gate but spaced therefrom in the direction of gate movement in moving from the closed position to the opened position; said stop means including a frame secured relative to the hopper and spreader and a movable member mounted within the frame and presenting a free board end adjacent the discharge gate; metering control means located in the cockpit to be operated by the pilot therein, and linkage means connected between the movable member and the metering control means operable upon actuation of the latter to shift the former closer to or further from the discharge gate, whereby the adjusted movable member of the stop means is engaged by the discharge gate means to accurately limit the extent of the opening of the outlet, and emergency release control means being located in the cockpit to be operated by the pilot therein, and linkage means connecting this control means to the stop means to disengage the stop means upon actuation of the control means.

5. The improved combination according to claim 4, wherein a nut is supported to move relative to the frame, wherein the movable member is in the form of a bolt threaded into the nut, and wherein means normally holds the nut fast relative to the frame but can be released by the emergency release control means.

6. The improved combination according to claim 5, wherein a tube is pivoted relative to the discharge gate and has a closed end adjacent the discharge gate, and wherein the bolt is telescoped within the tube and abuts the closed end to limit the opening movement of the discharge gate.

7. The improved combination according to claim 6, wherein the linkage means is in the form of a flexible shaft assembly.

8. A spreader unit for connection to a hopper carried in an airplane for spreading granular material at a controlled rate of flow;

said spreader unit being attached to the hopper and having a discharge opening, a moveable gate on said spreader movable between a closed position covering said discharge opening and open position defining a gap through which granular material may flow;

actuator means extending from said gate to the cockpit of the airplane for manipulation by the pilot to shift said gate between open and closed positions;

adjustable control means located adjacent said gate for adjustable limiting the movement of said movable gate in the opening direction to control the size of gap and thereby the flow rate of granular material;

operating means for extending from said adjustable control means to the cockpit for operation by the pilot to set the size of the gap and thereby the flow rate, an emergency release gate, means for shifting said emergency release gate to an open position to dump the load in the hopper, and means for disabling said adjustable control means to allow said movable gate to swing to a fully open position along with said emergency release gate.

said means for disabling said control means comprising a releasable catch means for said adjustable control means, said adjustable control means comprising a nut held by said catch means and a threaded shaft threaded through said nut and having a stop surface for limiting the opening movement of said movable gate until said catch means releases said nut.

* * * * *